United States Patent
Neumeier (10) Patent No.: US 9,616,532 B2
(45) Date of Patent: Apr. 11, 2017

(54) METHOD AND APPARATUS FOR PERFORMING A SEARCH AND FEEL ASSEMBLY FUNCTION

(71) Applicant: Honda Motor Co., Ltd., Minato-ku, Tokyo (JP)

(72) Inventor: Samuel J. Neumeier, Troy, OH (US)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 14/261,715

(22) Filed: Apr. 25, 2014

(65) Prior Publication Data

US 2015/0306716 A1  Oct. 29, 2015

(51) Int. Cl.
| | |
|---|---|
| *B23P 19/10* | (2006.01) |
| *B23P 19/06* | (2006.01) |
| *B25J 9/16* | (2006.01) |
| *B25J 13/08* | (2006.01) |

(52) U.S. Cl.
CPC .............. *B23P 19/10* (2013.01); *B25J 9/1687* (2013.01); *B25J 13/087* (2013.01); *B23P 19/06* (2013.01); *G05B 2219/45091* (2013.01); *Y10T 29/49895* (2015.01); *Y10T 29/53052* (2015.01); *Y10T 29/53061* (2015.01)

(58) Field of Classification Search
CPC ......... B23P 19/10; B23P 19/06; B25J 13/087; B25J 9/1687; G05B 2219/45091; Y10T 29/53052; Y10T 29/53061; Y10T 29/49895
USPC .................................. 29/464–466, 712, 714
See application file for complete search history.

(56) References Cited

U.S. PATENT DOCUMENTS

| | | | |
|---|---|---|---|
| 4,706,379 A | 11/1987 | Seno et al. | |
| 4,969,582 A * | 11/1990 | Gauger | B23K 9/206 221/260 |
| 5,098,003 A * | 3/1992 | Young | B25C 1/04 227/114 |
| 5,562,320 A * | 10/1996 | Bloomberg | B25J 15/0253 294/119.1 |
| 5,733,089 A * | 3/1998 | Albright | B21J 15/32 221/310 |
| 6,355,900 B1* | 3/2002 | Sherman | B23K 11/0053 219/117.1 |
| 6,550,359 B1* | 4/2003 | Graham | B23P 19/006 81/431 |
| 6,878,897 B1* | 4/2005 | Landis | B23K 11/0053 219/119 |
| 7,487,583 B2* | 2/2009 | Craythorn | B21J 15/32 221/156 |
| 7,821,417 B2* | 10/2010 | Burwell | B23K 31/125 219/119 |
| 8,264,366 B2* | 9/2012 | Chamarti | G01D 21/00 340/10.42 |
| 8,513,561 B2* | 8/2013 | Kuechenmeister | B23K 11/004 219/117.1 |

(Continued)

Primary Examiner — Essama Omgba
Assistant Examiner — Bayan Salone
(74) Attorney, Agent, or Firm — Arent Fox LLP (57) ABSTRACT

A system and method for implementing a search and feel function on a robot for installing parts on a workpiece. An air switch feature is provided on a gripper of the robot to determine the presence and proper placement of a part in a desired receptor location on the workpiece. The air switch feature is used to detect whether or not a particular part, such as a bolt or other part being inserted by the robot, has been properly gripped by the gripper, and whether the part has been properly placed in the desired position.

22 Claims, 4 Drawing Sheets

(56) References Cited

U.S. PATENT DOCUMENTS

| | | | |
|---|---|---|---|
| 9,278,798 B2 * | 3/2016 | Neumeier | B65D 83/02 |
| 9,299,209 B2 * | 3/2016 | Neumeier | G07F 11/02 |
| 2003/0081825 A1 | 5/2003 | Mitterholzer | |
| 2010/0059486 A1 * | 3/2010 | Aoyama | B23K 9/206 219/79 |
| 2011/0223000 A1 * | 9/2011 | Martinez | B25J 9/1687 414/730 |
| 2011/0225787 A1 * | 9/2011 | Sato | B25J 9/1687 29/407.01 |
| 2014/0076913 A1 * | 3/2014 | Neumeier | B65D 83/02 221/1 |
| 2014/0263386 A1 * | 9/2014 | Neumeier | G07F 11/02 221/1 |

* cited by examiner

METHOD AND APPARATUS FOR PERFORMING A SEARCH AND FEEL ASSEMBLY FUNCTION

BACKGROUND

Conventional approaches for inserting bolts in receptacles on an assembly line using a robot leave open the possibility that the bolt might be inserted improperly or not inserted at all, potentially leading to a loss of efficiency on the assembly line when the problem is discovered and corrected. The problem can also occur with the automated insertion of other parts onto a workpiece.

SUMMARY

Provided are a plurality of example embodiments, including, but not limited to, a device for installing a part on a workpiece, where the device includes a source of pressurized air and a robot having a gripper for gripping the part and for aligning the part with a desired receptor on the workpiece. The gripper is provided with a surface having an orifice connected to the source of pressurized air, with the orifice being arranged on the gripper such that the orifice is at least partially obstructed by a portion of the part when the part is positioned in a particular manner in the gripper. The device also includes a sensor adapted for detecting a pressure of air provided to the orifice, and a controller connected to the sensor. The controller is adapted to detect when the orifice is at least partially obstructed by monitoring the pressure detected by the sensor for determining when the part is properly aligned with the receptor.

Also provided is a device for installing a part on a workpiece, with the device including a source of pressurized air with an airline connected to the source of pressurized air; and a robot including a gripper for gripping the part for aligning the part with a receptor on the workpiece. The gripper is provided with a flat surface on a movable section adapted for receiving a portion of the part, the surface having an orifice connected to the air line for receiving pressurized air, the orifice being arranged on the movable section such that the orifice is at least partially obstructed by the portion of the part when the part is positioned in a particular manner in the gripper. The device also includes a sensor in communication with the pressurized air, the sensor being adapted for detecting a back pressure of the air provided by any obstruction of the orifice; and a controller connected to the sensor, and a controller being adapted to detect when the orifice is at least partially obstructed by monitoring the back pressure detected by the sensor for determining when the part is being properly held by the gripper. The controller is further adapted to detect whether the part is properly aligned in the gripper during a first operation of the robot by monitoring the back pressure detected by the sensor. If the controller detects that the part is improperly aligned in the gripper during the first operation of the robot, the controller is further adapted to instruct the robot to execute a second operation to correct the improper alignment of the part in the gripper.

Still further provided is a method for installing a part on a workpiece using a robot having a gripper for gripping the part, the method comprising the steps of: providing pressurized air to an orifice on the gripper; loading the part on the gripper; and detecting an alignment of the part on the gripper by monitoring a back pressure of the pressurized air. If an improper alignment of the part on the gripper is detected, the part is replaced on the gripper with another part. The method further comprises attempting a first insertion operation using the robot to insert the part in a receptor of the workpiece, and determining whether the part has been properly inserted by the robot into the receptor of the workpiece by monitoring the back pressure of the pressurized air. If it is determined that the part has been properly inserted, the gripper is actuated to release the part into the receptor, but if it is determined that the part has not been properly inserted in the receptor, a search function is executed using the robot to search for the receptor, wherein if the search function finds the receptor, actuating the gripper to release the part into the receptor.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Provided are example embodiments implementing a search and feel function on example robots as disclosed herein, representing a unique adaptation of an assembly line operation by using an air pressure switch provided on a robot to determine the presence and placement of a part in a desired receptor location on a workpiece. Such use of an air pressure switch, also referred to as an air switch feature, enhances the operation of the robot insertion of the part into the workpiece. The air switch feature is used to detect whether or not a particular part, such as a flange bolt or other part being inserted by a robot into a reception area on a target workpiece in an assembly line operation, has been properly placed in the desired position. The detection can be accomplished first while the robot is holding the part prior to placement, and then when the robot has placed the part near and/or into the desired receptor location, such as in a hole, receptacle, slot, gap, mate, or other receiving location.

The air switch feature can be used to determine whether the particular part has been properly disposed in the corresponding position in the workpiece. If it is determined that the part has not been properly positioned, then further actions may include another attempt to insert the part again using an alternative procedure, inserting another part (e.g., in case the original part is defective), or to flag the improper insertion for some other response, such as by notifying an operator to manually correct the problem or noting a defective receptor.

For at least one embodiment, a robot uses a gripper for gripping parts that are to be inserted into corresponding desired receptor locations on a workpiece adapted for receiving the parts. The robot is modified by adding an air switch feature on the gripper for detecting a position of the part prior to and during the insertion. Such a modification can be done by creating a path for air flow from a source of air to travel through a portion of the gripper for communication with the part, such that interruption of the air flow can be detected by a sensor, and this interruption can be used by a controller to control the operation of the robot and in particular the operation of the gripper.

An example air switch feature operates by providing low pressure air passed through an orifice, which is a small hole, in a surface of the gripper of the robot that holds a part. When used properly, the part can be sensed when it is in the proper position for release into a desired receptor location of a workpiece (such as placing the bolt into a corresponding hole in a cast workpiece). The location and placement of the air switch feature in conjunction with the location and placement of the robot can be used to accurately determine whether or not the part (e.g., bolt) has been properly positioned on the gripper and when it has been properly placed into the desired location (e.g., hole), and hence is ready to be released by the robot. The robot can then proceed to insert the next bolt into the workpiece or to work on another workpiece.

This part placement process improves the accuracy of setting parts in position for product assembly and helps to improve the placement rate and efficiency of the process. When the robot places the part close to its intended location, software on a computer or other robot controller will use measured air pressures detected by the air switch to confirm the proper presence and placement of the part on the robot gripper. If the part is misplaced on the gripper, due to misalignment of the part on the gripper or with the desired placement location on the workpiece, the air switch will detect a significantly different reading than if the part had been properly positioned. In a misalignment situation, the software will prevent the gripper from opening to release the part, and instead will run an alternative placement routine in an attempt to properly place the part or choose another part for placement.

For the example embodiments discussed below, the parts are flange bolts that are to be installed in holes in a cast workpiece, but this methodology can be applied to other types of parts and other types of workpieces.

Figure 1:
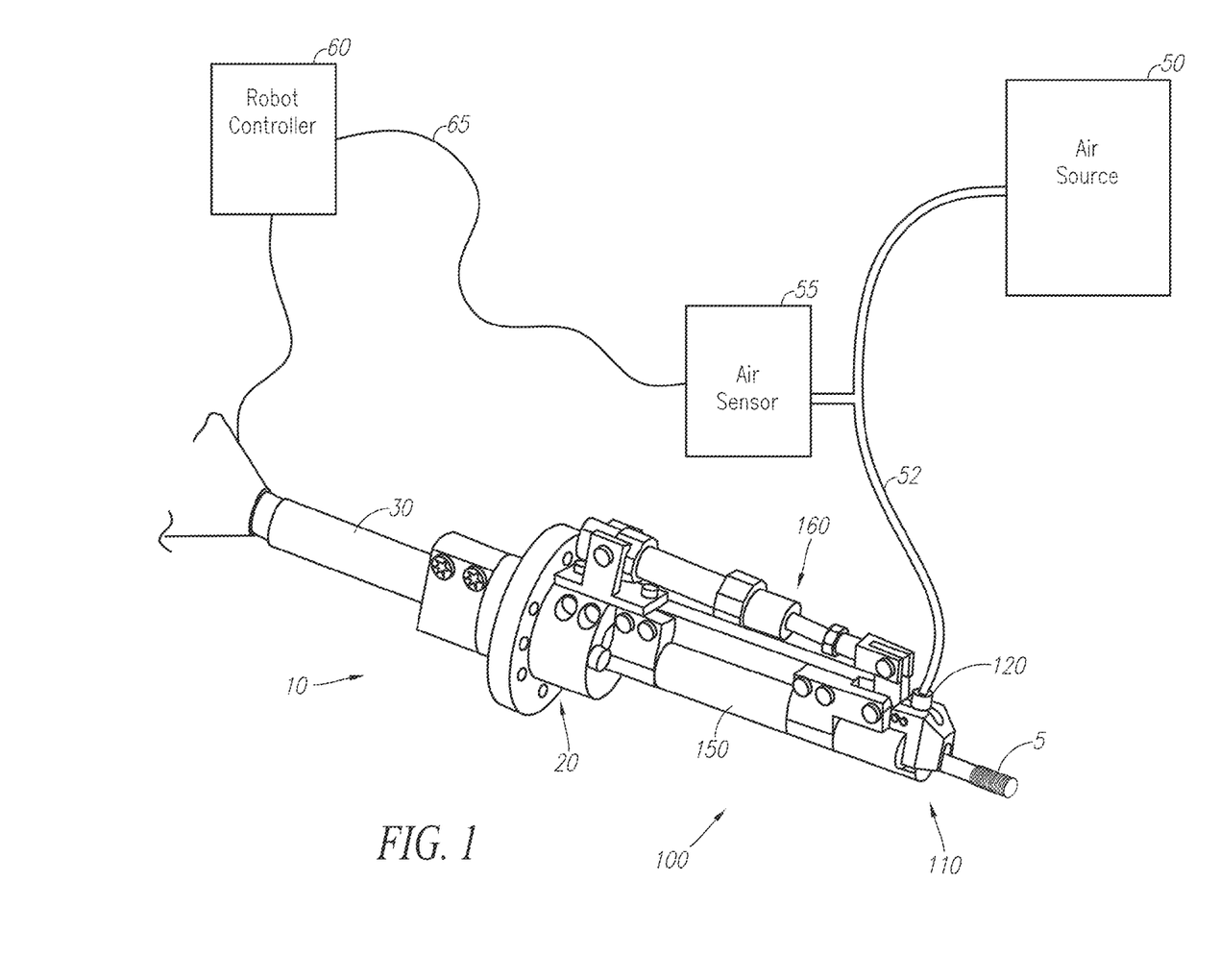
FIG. 1 is a schematic diagram showing one example embodiment of a search and feel function system.

FIG. 1 is a schematic diagram of an example robot arm 10 fitted with an air switch feature for an example embodiment. The robot arm 10 includes a hollow tube portion 30 for holding a supply of bolts (i.e., a bolt queue) for feeding to a bolt feeder 20 that includes a bolt holder 100 for feeding a supply of bolts to a desired location on a workpiece (not shown) by motion of the robot arm 10 properly positioning the bolt holder 100 with respect to the workpiece. An actuator 160 is provided for activating a nosepiece 110 for releasing a bolt 5 into a desired location (i.e., receptor) on the workpiece. The nosepiece 110 is connected to an air source 50 via a supply line 52 attached to an air hose connector 120.

A pressure sensor 55 is attached to the air supply line 52 to measure the pressure in the air supply line. Alternatively, the pressure sensor 55 could be incorporated into the air source 50 or into the nosepiece 110, or the pressure sensor 55 can be provided anywhere along the length of the air supply, as desired. The sensor 55 provides measured pressure data to a robot controller 60 via a data connection 65 to provide desired pressure measurements. The robot controller 60 can be any state of the art programmable device for controlling the operation of the robot. The pressure sensor 55 can essentially operate as a pressure gauge that can detect a range of pressures to trigger an alarm or other action as desired.

Figures 2A, 2B, 3:
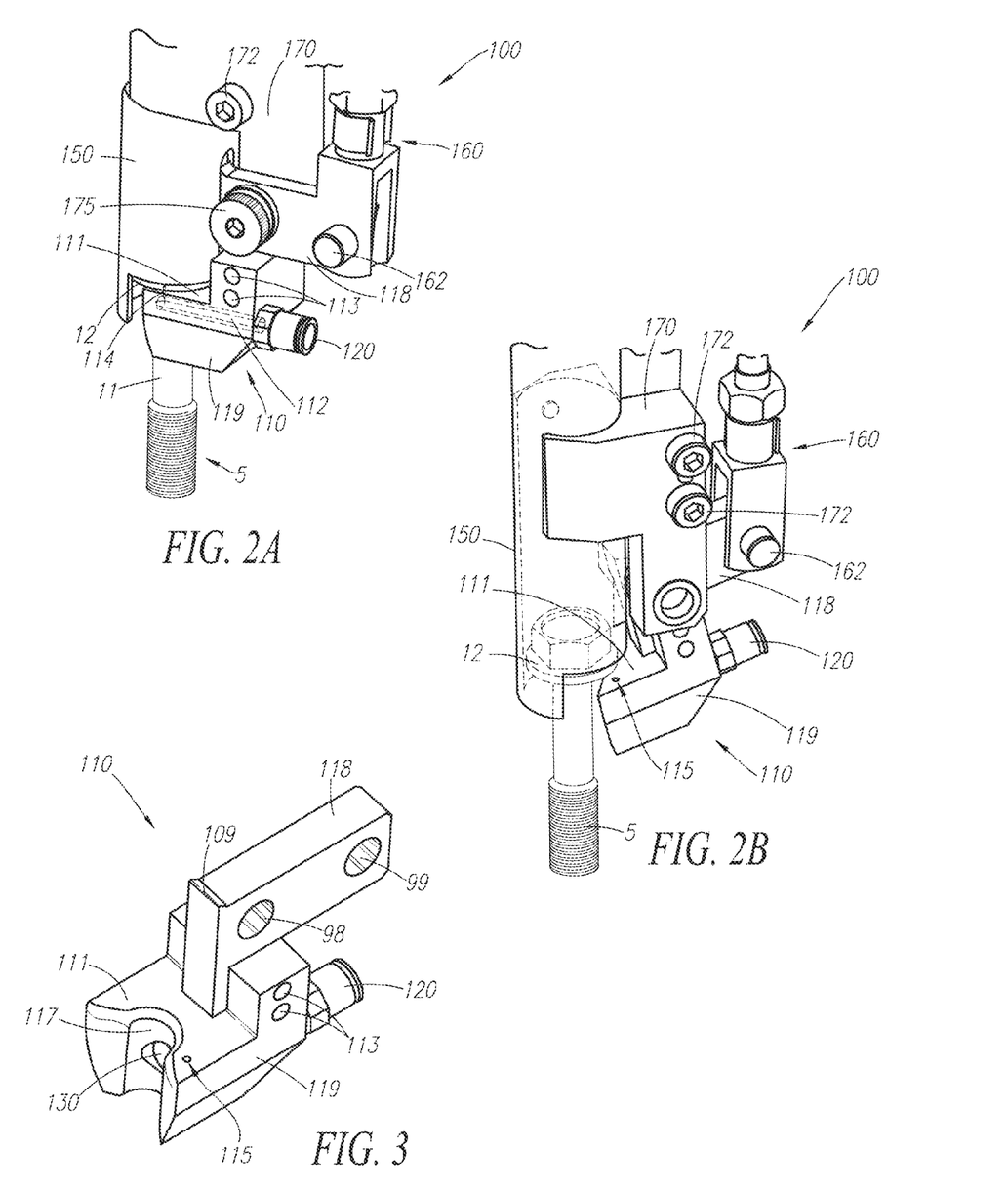
FIG. 2A is a schematic diagram of a bolt holder portion of a robot used in the system of FIG. 1.
FIG. 2B is a schematic diagram of another view of the bolt holder of FIG. 2A.
FIG. 3 is a schematic diagram of a nosepiece of the bolt holder of the above figures.

FIG. 2A shows a schematic of a close-up of the bolt holder 100 portion of the robot with FIG. 2B showing a schematic of an alternate view of the bolt holder 100. The bolt holder 100 includes a bolt reservoir 150 through which the supply of bolts is fed for placement and the nosepiece 110 which is a movable section. The nosepiece 110 loosely holds the bolts in the bolt reservoir 150 before release for placement and pivots about pivot pin 175 by action of the actuator 160 to allow placement of the bolts into the desired position. A portion of the actuator 160 is shown with a pin 162 for attaching the actuator 160 to a pivot arm 118 of the nosepiece 110. The nosepiece 110 is attached to the bolt reservoir 150 via a nosepiece holder 170 and a pivot pin 175. The nosepiece 110 has a base 119 with a surface 111 for interacting with a flange 12 of the bolt 5 and a concave portion (not shown) for receiving a bolt shank 11. Fasteners 172 are used to clamp the nosepiece holder 170 to the bolt reservoir 150.

FIG. 2A shows the bolt holder 100 partially in phantom to show an air channel 112 that supplies air to an air hole 115 (see FIG. 2B) via a second air channel 114. This air hole 115 provides an orifice for air provided by an air supply (not shown) to escape from the air channel 112. A small hole is drilled into the base 119 of the nosepiece 110 from the back to form the first air channel 112. The surface 111 of base 119 is also drilled (at 90 degrees) to form the second air channel 114 and the air hole 115 providing the air orifice. The air hose connector 120 is adapted to connect to an external air hose (not shown) for supplying air to the air channel 112.

FIG. 2A also shows the bolt 5 with the bolt flange 12 held in place by the surface 111 of the nosepiece 110 in a closed position. Note that the air hole 115 (see FIG. 2B) is substantially blocked by the flange 12 in this closed position by the portion of the flange 12 resting on the surface 111. With the nosepiece in this closed position, the air switch feature can detect that the bolt is in a proper position for being moved by the robot to the workpiece for placement at a desired location (such as a receptor portion of the workpiece).

In contrast, FIG. 2B shows the bolt holder 100 with a bolt reservoir 150 provided in phantom to show the flange 12 of the bolt 5 provided therein. The other bolts that may be in the bolt queue on top of the bolt 5 are not shown. The nosepiece 110 is shown in a partially pivoted position such that the bolt flange 12 partially unblocks the air hole 115. When the nosepiece 110 is fully pivoted, the bolt 5 can drop out of the nosepiece 110 (e.g., by action of gravity if the bolt holder is in a substantially vertical position, or by pulling away the bolt holder 100 with the bolt resting on its side in a corresponding hole if the bolt holder is in a substantially horizontal position).

FIG. 3 shows a schematic of the nosepiece 110 adapted for use with the air switch feature. The pivot arm 118 has a ridge 109 and a pair of holes 99 and 98. The ridge 109 is used to prevent the next bolt in the bolt queue that is being fed to the bolt holder 100 from completely dropping into place when the nosepiece 110 is in a pivoted position. The base 119 is shown with the air hole 115 and a concave portion 117 adapted to receive the shank of the bolt (not shown). The air channels for supplying air to the air hole 115 are provided within the base 119 connecting to the air hose connector 120, but are not shown in FIG. 3. An optional magnet 130 is provided in the concave portion 117 of the base 119 to aid in holding the bolt in place when the robot arm pivots the nosepiece 110 to release the bolt into the desired position. Pins 113 are used to hold the pivot arm 118 to the base 119.

Effectively, the pivotable nosepiece 110 in combination with the actuator 160, the nosepiece holder 170, the pivot pin 175, and the bolt reservoir 150 act as the "gripper" for loosely gripping the bolt 5 during the placement operation. Note that rather than using a pivoting nosepiece, the nosepiece could be slid in and out, or otherwise made movable in order to release the bolt. In such a situation, another movable section may be provided at least partly within the bolt reservoir to hold the bolts still in the queue in place while the bolt is released.

A bottom surface of the flange 12 of the bolt 5 is the surface that is detected by the air switch feature. Referring back to FIG. 1, light positive air pressure is provided from the air source 50 through the pressure sensor 55 through the orifice of air hole 115 to detect the presence or absence of bolt 5. The bolt flange 12, when fully resting on the surface 111 of the base 119 that has the air hole 115 providing the orifice through which the air is provided, provides back pressure and thus causes a higher or increased pressure to be detected by the sensor 55. As the space between the flange 12 of the bolt 5 and the surface 111 of the base 119 increases (and hence the air hole 115 has less coverage by the flange 12), the back pressure measured by sensor 55 is reduced. Thus, one can set a range of detection based on the measured back pressure.

The "air switch feature" is, in effect, comprised of the combination of the air hole 115 and channels 112, 114, the air supply components 50, 52, and the pressure sensor 55, combined with the robot controller 60 interpreting the detected pressures to determine if the bolt is properly positioned on the gripper and/or in the hole.

A robot such as described above is provided with a plurality of bolts provided in a bolt queue. The next bolt in the queue to be placed in a desired position on a cast workpiece is held in position by the gripper without holding it firmly to allow some movement in holding the bolt, to provide more flexibility on bolt placement and allow for erroneous positioning. Thus, the bolt is held by the gripper in a manner that allows it to move back up into the bolt reservoir by pushing the other bolts in the queue back up the reservoir. The weight of the bolt and the other bolts in the queue above it provide sufficient downward force to make the bolt tend to rest the bolt's flange on a surface of the base of the nosepiece in a manner which substantially covers the air hole in the nosepiece and hence provides a measurable backpressure that is detected by the pressure sensor.

The shape of the base concave portion is designed to fit the shank of the bolt to help provide proper alignment. The magnet in the base concave portion is provided to make sure the bolt is held in the bolt holder, but this magnetic force is still loose enough to allow the bolt to move up into the tube during placement if the desired hole is not located, and hence the bolt is pushed into the bolt holder by the workpiece.

Figure 4A:
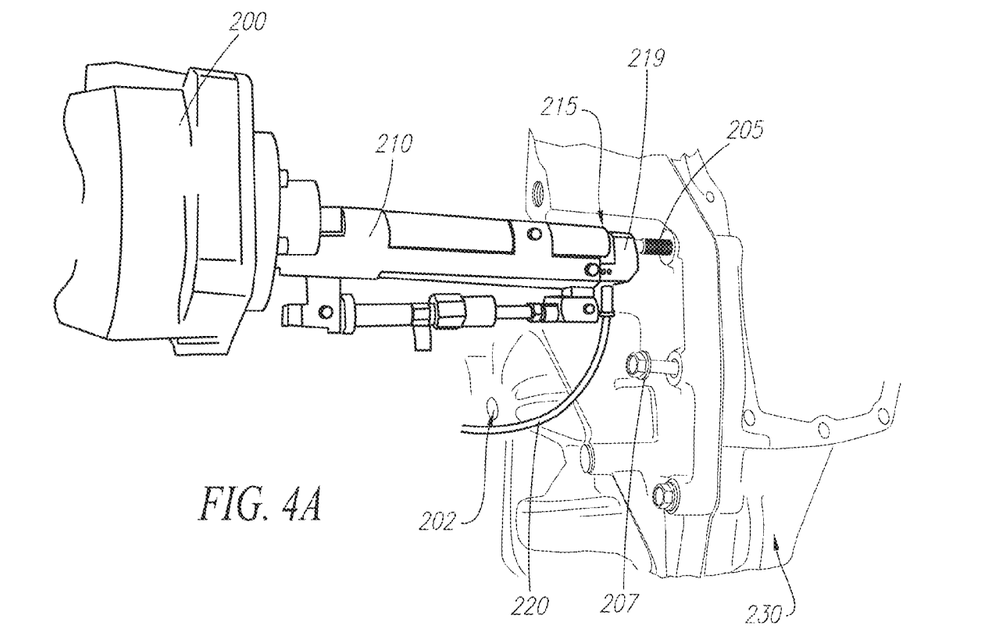
FIG. 4A is a schematic diagram of a particular example embodiment of a search and feel function system for installing bolts in holes on a workpiece.
Figure 4B:
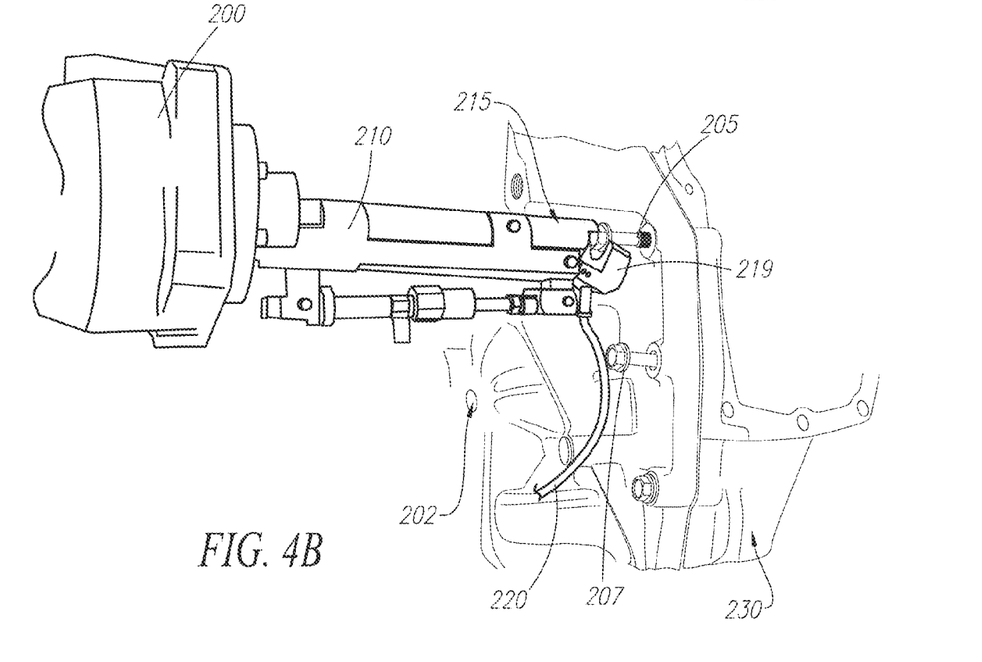
FIG. 4B is a schematic diagram of an alternative view of the example embodiment of FIG. 4A.

An example assembly method that can be adapted as disclosed herein is the process of placing flange bolts into corresponding bolt holes in a workpiece using a compact flange bolt escapement with an embodiment of the search and feel assembly function system. Such a system is mounted to a robot and is adapted for inserting flange bolts into holes on a workpiece, such as the example shown in FIGS. 4A and 4B. In FIG. 4A, a robot arm 200 uses a bolt holder 210 to insert a bolt 205 held by a gripper 215 (with a nosepiece 219 shown in a closed position, thereby holding the bolt 205 loosely in position) into a corresponding bolt hole such as a hole 202 of a workpiece 230. Also shown in the FIG. 4A are a previously inserted bolt 207 and an air hose 220 for supplying air to the air switch feature. FIG. 4B shows the image of FIG. 4A captured a few moments later with the nosepiece 219 provided in an open position with the robot arm 210 pulling away from the workpiece 230 having released the bolt 205 already inserted in its corresponding hole in the workpiece 230.

The gripper 215 with its nosepiece 219 is tailored or designed to fit the size (diameter) of the bolt 205 and is shaped as such to fit the shank of the bolt 205 and to allow the flange of the bolt 205 to rest on the surface of the gripper 215 (as described in more detail in the example embodiments discussed regarding FIGS. 1-3). Different lengths of bolts of the same or similar diameter can be utilized in the same system because the bolt is held just below its flange, and hence the length of the bolt only affects how it is held to a minor degree. However, in some circumstances the length of the bolt shank can affect how the gripper is shaped, and hence extra space can be provided below the shank due to bolt threads (not shown) being rolled at a greater diameter.

Effectively, the nosepiece opens (by pivoting) for the gripper to release a bolt in this example. The nosepiece also acts as a "trigger" to prevent the next bolt in the queue from falling out completely when the original bolt is released and until the nosepiece is returned to the closed position, because the flange of the next bolt cannot pass this trigger (see, for example, the ridge 109 described above with respect to FIG. 3). This trigger operates similar to an escapement of a watch timepiece and is adapted to maintain the weight of the column of bolts on the next bolt to be positioned. In other words, a constant downward force (when the robot arm is held at least partially vertically) is provided on the next bolt being placed, but this force is not sufficient to prevent a mislocated bolt from forcing the column of bolts back up into the robot, since the gripped bolts are not held tightly by the gripper. The design of the trigger (e.g., an escapement plate) is what sets the distance between the bolt being placed and where the next bolt in the queue gets stopped. This distance can be adjusted to improve the performance of the assembly to more easily align and grab the bolt when the trigger (escapement) closes back up.

The robot controller is programmed to operate the robot for placing each bolt into a corresponding bolt hole in the workpiece. The example compact flange bolt escapement with search and feel assembly function is designed to allow this to be done in relatively tight quarters. Due to part tolerances, pallets, and robots, locating a hole can often diverge from predicted locations. In one example application, bolt holes are only approximately 250 microns larger than the diameter of the rolled threads of the bolt, it can be difficult to place the fasteners into the holes with a high degree of success.

The program for the robot is written to sense whether or not the air switch feature contact occurs at the critical point in the placement (insertion into corresponding receptor) process. In addition, the search and feel function can be simple and inexpensive to operate. This process replaces the need for significantly more complex vision systems. The search and feel function allows for accommodating small tolerances in cast and/or machined hole locations, and for lift and locates used to position parts in the same location from pallet to pallet. The search and feel function provides a desired check and correction of placement.

As discussed above, due to the way the gripper of the compact flange bolt escapement grips the bolt, the example search and feel function system allows a mislocated bolt to move up into the queue of bolts during the placement process, which can be detected by the search and feel function. For this example approach, although the pressure sensor is effectively constantly monitoring the gap between the bolt flange and the flange resting surface of the gripper (thereby detecting when an air hole on the surface of the nosepiece is obstructed; see, for example, the discussion of FIG. 3 above), the pressure sensor output need only be sampled by a controller at certain times.

For the example application, the pressure sensor output is sampled prior to positioning and placement of the flange bolt. The value of the pressure sensor output is used to confirm that the bolt is properly positioned in the gripper, thereby substantially or totally covering the air orifice on the nosepiece, and hence having maximum back pressure detected by the sensor. This can provide a distinct advantage at this point, because if a bolt is not fully setting on the surface of the nosepiece (and hence not sufficiently covering the air orifice), it is likely not in proper alignment and thus the pressure sensor will detect this misalignment. In such a situation, the robot controller can be programmed to execute a particular operation, such as an eject cycle to dispense the misaligned bolt into a waste bucket to allow the next bolt to align properly, or a search function to find the mislocated hole. This becomes a self-clearing or error avoiding function to deal with misaligned bolts and/or holes (such as when bolts are defective, or holes are not quite where they were expected, for example).

When the bolt is being positioned by the robot and placed in an expected location on the part (e.g., in the bolt hole), if the leading edge of the bolt does not properly insert into the receiving hole on the workpiece, the bolt will be dislocated in the gripper by contact with the workpiece, and hence the bolt flange surface will be pushed off of the surface of the nosepiece where the air orifice is located on the nosepiece surface (e.g., see FIGS. 2A, 2B, and 3). To detect such a situation, the pressure sensor is sampled by the controller at about the expected time when the bolt should begin entering the hole. This timing is important, and can be adjusted for the lengths of particular bolts and expected location of holes.

Once the robot is in a position where the bolt should have begun entering the hole (e.g., 1 to 3 mm), the pressure sensor is sampled by the controller to determine if the bolt flange is still in the proper position (i.e., if the positioning is incorrect, the bolt will tend to be pushed back into the bolt queue, and hence uncovering the air orifice and reducing the back pressure below the expected value when covered). If it is determined by the controller that the bolt is still in the proper position (i.e., covering the air orifice), the robot continues to insert the bolt into its proper release point (which is typically the point where the trigger of the compact flange bolt escapement activates and releases the bolt), and the gripper releases the bolt which then remains or falls into the desired hole.

If the gap increases between the bolt flange and air orifice (i.e., pressure decreases at the pressure sensor) at around the 1 to 3 mm insertion point, the controller determines that a misalignment has likely occurred and is programmed to have the robot execute a "search" function. This search function can be tailored to a particular bolt or part, but for an example: the robot can run 2 mm in, then 4 mm back, then 2 mm back to the point of origin, then 2 mm at 90 degrees, then 4 mm to the other side. This routine basically makes a "+" motion in the proximity of the hole to seek out the hole.

If the bolt does not drop into the hole to reset the sensor (i.e., to allow the flange of the bolt to again rest upon the surface of the bolt holder, causing greater back pressure at the pressure sensor to be detected), the robot is programmed to do a similar search function again, but shifting the search routine, for example, by 45 degrees. The shifted routine traverses an "X" pattern in contrast to the original "+" pattern. Essentially, the air pressure is monitored during the entire search function, and if at any point the controller detects that the detected pressure is raised to the expected amount, then the bolt has likely partially dropped into the proper hole. When this occurs, the robot is programmed to fully insert the bolt into the hole to the release point and operate the compact flange bolt escapement trigger to release the bolt from the gripper. In this fashion, a misaligned bolt or hole may be corrected, avoiding any manual operation that would slow the process.

Figure 5:
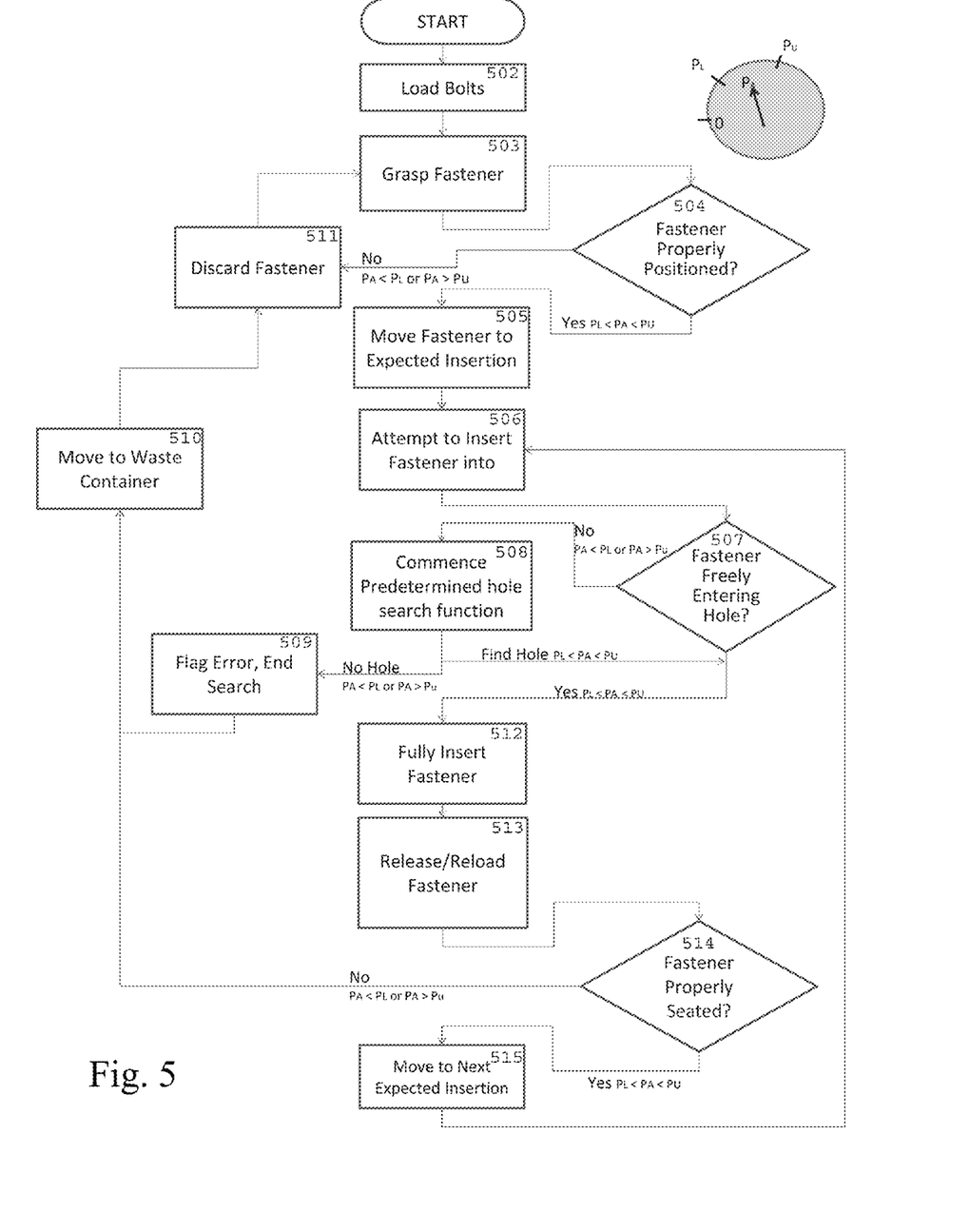
FIG. 5 is a flow chart showing one example process of installing bolts in holes on a workpiece using the example embodiments of FIGS. 4A and 4B.

FIG. 5 is a flow chart showing an example implementation of the above process to install bolts in corresponding holes on a workpiece. First, the controller loads the reservoir with fasteners 502. Then, the controller activates the trigger to allow a fastener (e.g., a bolt) to be grasped by the holder 503. The controller then determines if the fastener is properly positioned 504 by using the air switch to confirm that the fastener is properly positioned and seated, which occurs when the back pressure detected by the pressure sensor is between the lower and upper pressure limits (i.e., the controller confirms the fastener is properly seated when the back pressure detected by the sensor is between predetermined lower and upper pressure limits: $P_L<P_A<P_U$ with $P_L$ being the lower pressure limit, $P_A$ the measured back pressure, and $P_U$ the upper pressure limit). If the controller detects an under-pressure or over-pressure (i.e., if $P_A<P_L$ or $P_A>P_U$), then the fastener may be defective or improperly loaded, in which case it is discarded 511 and another fastener is selected (grasped) 503.

But if the back pressure is detected within the proper range (i.e., $P_L<P_A<P_U$), then the controller instructs the robot to move the fastener to the expected insertion location 505 where the hole is expected, after which the controller instructs the robot to attempt an insertion of the fastener 506 into the expected hole location by moving the fastener into the hole (e.g., typically by moving about 1 to 3 mm toward the hole, depending on bolt size/surface of casting). The controller determines whether the fastener is freely entering the hole 507 by monitoring to ensure that $P_L<P_A<P_U$ in which case the controller causes the robot to fully insert the fastener 512 by proceeding to place the fastener at full insertion depth and then releasing the fastener (e.g., the bolt holder can pull away from fastener). But if the fastener is not freely entering the hole (e.g., $P_A<P_L$ or $P_A>P_U$), then the controller commences having the robot perform a predetermined hole search function 508 (based on various path and repeat motions, which may be predetermined and could vary based on the particular situation).

However, if the controller determines that the hole cannot be found using the hole search function 508 (e.g., by detecting that $P_A<P_L$ or $P_A>P_U$ without finding that $P_L<P_A<P_U$) then an error is flagged and the search is ended 509, in which case the controller moves the fastener toward a waste container 510, and the fastener is discarded 511, and the process is restarted by grasping another fastener 503.

But if the controller detects a pressure rise before the search function 508 is completed, then it is assumed that the hole has been found, and the controller instructs the robot to fully insert the fastener into the hole 512, after which the controller instructs the robot to release and reload the fastener 513 by rising above the release location and allowing the next fastener to drop into the holder (the holder closes to place the fastener with the flange resting on the sensing hole).

The controller then determines if proper seating of the inserted fastener 514 has occurred by testing whether $P_L < P_A < P_U$. If the fastener is properly seated and hence the next fastener is properly in position (i.e., $P_L < P_A < P_U$), then the controller moves the robot to the next expected insertion location 515, and the placement process repeats.

However, if it is determined that the next fastener is not properly seated 514 (i.e., $P_A < P_L$ or $P_A > P_U$), such as when the next fastener was not properly placed at the hole, causing that next fastener to fail to be properly positioned in the holder, then the robot moves to the waste container 510 and discards the next fastener 511, and the process continues to place still another fastener in that original location. This process can continue as long as workpieces and fasteners are provided to the robot for assembly.

Note that a detected sensor value which exceeds $P_U$ could indicate a plugged sensing hole, while a sensor value at or near "0" could indicate either a problem with air supply or a broken hose.

The search and feel function essentially emulates what a worker would perform on an assembly line. Workers commonly place bolts without actually looking because they know or sense where a hole is from experience, and workers can sense or feel a bolt entering a hole, and thus drop the bolt once they sense it has started to enter the hole. The search and feel function performs a similar process by detecting when the bolt begins to properly enter the hole or by detecting when the bolt is not properly entering the hole (i.e., indirectly sensing the pushback of an improper insertion by monitoring the air pressure of the air switch feature).

For other applications, the timing and positions of how the search and feel function operates can be modified to compensate for various part surface roughness or material, bolt lengths, and forces on the bolt in the bolt queue. The process can be adapted for placing other types of parts into desired receptor areas of workpieces adapted for receiving the parts (e.g., any time a part is to be inserted into a hole or depression).

Generally, the methodologies described herein can be used for existing or future assembly operations using programmable robots as are known in the art of manufacturing and product assembly. Such robots can be programmed to perform the functions described herein in any manner currently utilized for programming industrial robots for performing automated operations as currently practiced, or as may be practiced in the future, and hence a description of such programming functions, robots, and robot controllers, and assembly operations need not be provided in any detail by this disclosure. Options for programming robot controllers or other controlling computers or systems may include, but are not limited to, using ladder logic, VAL, Epson RC+, ROBOFORTH, LabVIEW, URBI, or any visual programming languages, scripting languages, or any other robot or other programming technique that may include use of commercial off-the-shelf language(s) that may be proprietary or open source.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A device for installing a part on a workpiece, comprising:
    a source of pressurized air;
    a robot including a gripper for gripping the part and for aligning the part with a desired receptor on the workpiece, wherein said gripper is provided with a surface having an orifice connected to the source of pressurized air, said orifice being arranged on said gripper such that said orifice is at least partially obstructed by a portion of the part when the part is positioned in a particular manner in the gripper;
    a sensor adapted for detecting a pressure of air provided to the orifice; and
    a controller connected to said sensor, said controller being adapted to detect that the part is properly aligned with the receptor when the pressure detected by said sensor indicates that the orifice is at least partially obstructed.

2. The device of claim 1, wherein said controller is further adapted for causing said gripper to release said part into said receptor when said part is properly aligned with said receptor.

3. The device of claim 1, wherein, after first attempting to align said part with said receptor, said controller is further adapted for detecting when said part is not properly aligned with said receptor.

4. The device of claim 3, wherein said controller is further adapted to cause said robot to perform a search operation when it is detected that said part is not properly aligned with said receptor, said search operation being adapted for properly aligning said part with said receptor.

5. The device of claim 1, wherein said controller is further adapted to cause said robot to perform a search operation when it is detected that said part is not properly aligned with said receptor, said search operation being adapted for properly aligning said part with said receptor.

6. The device of claim 5, wherein said search operation includes moving said part in a "+" pattern.

7. The device of claim 6, wherein said search operation also includes moving said part in an "X" pattern.

8. The device of claim 5, wherein said controller is further adapted for causing said gripper to release said part into said receptor when said part is properly aligned with said receptor at any time during said search operation.

9. The device of claim 1, further comprising an air line connecting said orifice to said source of pressurized air, wherein said sensor is installed on an air line for detecting a pressure in said air line.

10. The device of claim 1, wherein said part is a bolt having a flange, and wherein said gripper further comprises a movable section including a flat surface comprising said orifice adapted for holding said flange in place such that said flange at least partially obstructs said orifice when said flange is resting on said flat surface.

11. The device of claim 10, wherein said robot is adapted to release said part by moving said moveable section.

12. The device of claim 11, wherein said controller is further adapted for causing said gripper to release said part into said receptor by moving said movable section when said part is properly aligned with said receptor.

13. The device of claim 12, wherein, after first attempting to align said part with said receptor,
said controller is further adapted for detecting when said part is not properly aligned with said receptor, and wherein
said controller is further adapted to cause said robot to perform a search operation when it is detected that said part is not properly aligned with said receptor, said search operation being adapted for properly aligning said part with said receptor.

14. The device of claim 1, wherein the part is a bolt, and wherein the portion of the part that at least partially obstructs said orifice is a flange of the bolt, and further wherein the receptor is a hole in the workpiece for receiving the bolt such that the bolt is aligned with the receptor when the bolt is at least partially inserted into the hole.

15. The device of claim 1, wherein said robot is adapted to store a plurality of the bolts for feeding to the gripper such that said controller is further adapted to detect whether a bolt fed to the gripper is being properly held by the gripper by monitoring the pressure detected by said sensor.

16. The device of claim 1, wherein the surface is flat and located on a movable section of the gripper for receiving at least a portion of the part, wherein when a part is gripped by said gripper, the movable section is capable of pivoting away from the part.

17. A device for installing a part on a workpiece, comprising:
a source of pressurized air;
an airline connected to said source of pressurized air;
a robot including a gripper for gripping the part and for aligning the part with a receptor on the workpiece, wherein said gripper is provided with a flat surface on a movable section adapted for receiving a portion of the part, said surface having an orifice connected to the air line for receiving pressurized air, said orifice being arranged on said movable section such that said orifice is at least partially obstructed by the portion of the part when the part is positioned in a particular manner in the gripper;
a sensor in communication with the pressurized air, said sensor being adapted for detecting a back pressure of the air provided by any obstruction of the orifice; and
a controller connected to said sensor, said controller being adapted to detect that the part is being properly held by the gripper when the back pressure detected by said sensor indicates that the orifice is at least partially obstructed, wherein
said controller is further adapted to detect whether said part is properly aligned in the gripper during a first operation of the robot by monitoring the back pressure detected by said sensor, and wherein
if the controller detects that said part is improperly aligned in the gripper during the first operation of the robot, the controller is further adapted to instruct the robot to execute a second operation to correct the improper alignment of the part in the gripper.

18. The device of claim 17, wherein the part is a bolt, and wherein the portion of the part that at least partially obstructs said orifice is a flange of the bolt, and further wherein the receptor is a hole in the workpiece for receiving the bolt such that the bolt is properly aligned with the receptor when the bolt is at least partially inserted into the hole.

19. The device of claim 18, wherein the robot is adapted to store a plurality of the bolts for feeding to the gripper such that said controller is further adapted to detect whether a bolt fed to the gripper is properly aligned in the gripper by monitoring the pressure detected by said sensor, and wherein the second operation to correct the improper alignment of the bolt in the gripper includes discarding the part and receiving a new bolt from a queue of bolts.

20. The device of claim 18, wherein said controller is further adapted to detect, by monitoring the pressure detected by said sensor, whether a bolt in the gripper is properly aligned in the gripper during the first operation that is an attempt to insert the bolt into the hole in the workpiece, and wherein said second operation is a search function for instructing the robot to search for the hole in the workpiece.

21. The device of claim 17, wherein when a part is gripped by said gripper, the movable section is capable of pivoting away from the part.

22. A method for installing a part on a workpiece using a robot having a gripper for gripping the part, the method comprising the steps of: providing pressurized air to an orifice on the gripper; loading the part on the gripper; detecting an alignment of the part on the gripper by monitoring a back pressure of the pressurized air using a sensor connected to a controller, wherein the controller is adapted to detect that the part is properly aligned in the gripper when the back pressure detected by the sensor indicates that the orifice is at least partially obstructed, wherein if an improper alignment of the part on the gripper is detected the part is replaced on the gripper with another part; attempting a first insertion operation using the robot to insert the part in a receptor of the workpiece; and determining whether the part has been properly inserted by the robot into the receptor of the workpiece by monitoring the back pressure of the pressurized air, wherein, if the part has been properly inserted, the gripper is actuated to release the part into the receptor, but if it is determined that the part has not been properly inserted in the receptor, a search function is executed using the robot to search for the receptor, wherein if the search function finds the receptor, the gripper is actuated to release the part into the receptor.

* * * * *